(12) United States Patent
Mizuno

(10) Patent No.: US 12,534,535 B2
(45) Date of Patent: Jan. 27, 2026

(54) MONOCLONAL ANTIBODY OR ANTIBODY FRAGMENT AGAINST CANINE CD20

(71) Applicant: NIPPON ZENYAKU KOGYO CO., LTD., Koriyama (JP)

(72) Inventor: Takuya Mizuno, Yamaguchi (JP)

(73) Assignee: NIPPON ZENYAKU KOGYO CO., LTD., Koryama (JP)

(*) Notice: Subject to any disclaimer, the term of this patent is extended or adjusted under 35 U.S.C. 154(b) by 982 days.

(21) Appl. No.: 17/762,407

(22) PCT Filed: Oct. 2, 2020

(86) PCT No.: PCT/JP2020/037514
§ 371 (c)(1),
(2) Date: Mar. 22, 2022

(87) PCT Pub. No.: WO2021/066134
PCT Pub. Date: Apr. 8, 2021

(65) Prior Publication Data
US 2022/0348676 A1    Nov. 3, 2022

(30) Foreign Application Priority Data
Oct. 3, 2019  (JP) ................... 2019-183079

(51) Int. Cl.
*C07K 16/28* (2006.01)
*A61P 35/00* (2006.01)
*A61K 39/00* (2006.01)

(52) U.S. Cl.
CPC .......... *C07K 16/2887* (2013.01); *A61P 35/00* (2018.01); *A61K 2039/505* (2013.01); *A61K 2039/552* (2013.01); *C07K 2317/40* (2013.01); *C07K 2317/732* (2013.01)

(58) Field of Classification Search
CPC ............ C07K 16/2887; C07K 2317/40; C07K 2317/732; C07K 2317/24; C07K 2317/41; C07K 2317/734; C07K 2317/56; A61P 35/00; A61P 35/02; A61P 43/00; A61P 37/02; A61K 2039/505; A61K 2039/552; A61K 39/395; G01N 2333/70596; G01N 33/57407; G01N 33/57426; G01N 33/68; G01N 2800/24
See application file for complete search history.

(56) References Cited

U.S. PATENT DOCUMENTS

| 10,519,244 B2 | 12/2019 | Pancook |
| 2003/0219433 A1 | 11/2003 | Hansen et al. |
| 2007/0148164 A1* | 6/2007 | Farrington .............. A61P 35/00 435/328 |
| 2013/0344077 A1 | 12/2013 | Hansen |
| 2014/0170137 A1 | 6/2014 | Gearing |
| 2014/0294819 A1 | 10/2014 | Gearing |
| 2015/0125453 A1* | 5/2015 | Rue ........................ A61K 45/06 424/139.1 |
| 2017/0355775 A1 | 12/2017 | Rue et al. |

FOREIGN PATENT DOCUMENTS

| AU | 2014200771 A1 | 3/2014 | |
| AU | 2016216708 A1 | 9/2016 | |
| JP | 2006-500904 A | 1/2006 | |
| JP | 2009-291197 A | 12/2009 | |
| JP | 2014-532649 A | 12/2014 | |
| JP | 2015-501146 A | 1/2015 | |
| JP | 2016-13104 A | 1/2016 | |
| JP | 2016-41750 A | 3/2016 | |
| JP | 2019-28625 A | 2/2019 | |
| JP | 2019-507128 A | 3/2019 | |
| WO | WO 03/068821 A2 | 8/2003 | |
| WO | WO-2011109108 A1 * | 9/2011 | ........... A61K 39/395 |
| WO | WO 2013/063186 A3 | 5/2013 | |
| WO | WO-2019164821 A1 * | 8/2019 | ............. A61K 35/17 |

OTHER PUBLICATIONS

Rudikoff et al. Single amino acid substitution altering antigen-binding specificity. Proc Natl Acad Sci USA 79: 1979-1983, 1982. (Year: 1982).*

Paul, Fundamental Immunology, 3rd Edition, 1993, pp. 292-295, under the heading Fv Structure and Diversity in Three Dimensions. (Year: 1993).*

(Continued)

*Primary Examiner* — Sean E Aeder
*Assistant Examiner* — Yie Chia Lee
(74) *Attorney, Agent, or Firm* — Birch, Stewart, Kolasch & Birch, LLP

(57) ABSTRACT

A monoclonal antibody against canine CD20 having a more excellent effect than existing antibodies having a heavy chain variable region consisting of an amino acid sequence of SEQ ID NO: 1 or an amino acid sequence in which one or several amino acids are deleted, substituted, or added in the amino acid sequence of SEQ ID NO: 1, and a light chain variable region consisting of an amino acid sequence of SEQ ID NO: 2 or an amino acid sequence in which one or several amino acids are deleted, substituted, or added in the amino acid sequence of SEQ ID NO: 2, and having a light chain constant region consisting of an amino acid sequence of SEQ ID NO: 3 or an amino acid sequence in which one or several amino acids are deleted, substituted, or added in the amino acid sequence of SEQ ID NO: 3.

6 Claims, 12 Drawing Sheets

Specification includes a Sequence Listing.

(56) References Cited

OTHER PUBLICATIONS

International Search Report, issued in PCT/JP2020/037514, dated Dec. 8, 2020.
Mizuno et al., "Generation of a canine anti-canine CD20 antibody for canine lymphoma treatment", Scientific Reports, 2020, vol. 10, Article No. 11476, pp. 1-12.
Rue et al., "Identification of a candidate therapeutic antibody for treatment of canine B-cell lymphoma". Veterinary Immunology and Immunopathology, 2015, vol. 164, pp. 148-159.
Written Opinion of the International Searching Authority, issued in PCT/JP2020/037514, dated Dec. 8, 2020.
Chinese Office Action and Search Report for Chinese Application No. 202080069648.8, dated Mar. 29, 2024, with English translation.
Japanese Office Action for corresponding Japanese Application No. 2019-183079, dated Jan. 10, 2024, with English translation.
International Preliminary Report on Patentability and Written Opinion mailed Apr. 14, 2022, in PCT/JP2020/037514.
Japanese Office Action for Japanese Application No. 2019-183079, dated Aug. 9, 2023, with an English translation.
Mizuno et al., "Summary of Lecture at the Scientific Session of the Japanese Society of Veterinary Medicine", vol. 162, Aug. 20, 2019, p. 460 (4 pages total), with an English abstract.
Extended European Search Report for corresponding European Application No. 20871889.0, dated Nov. 16, 2023.
Ito et al., "Development of a novel anti-canine CD20 monoclonal antibody with diagnostic and therapeutic potential," Leukemia & Lymphoma, vol. 56, No. 1, Jan. 2015, pp. 219-225.

* cited by examiner

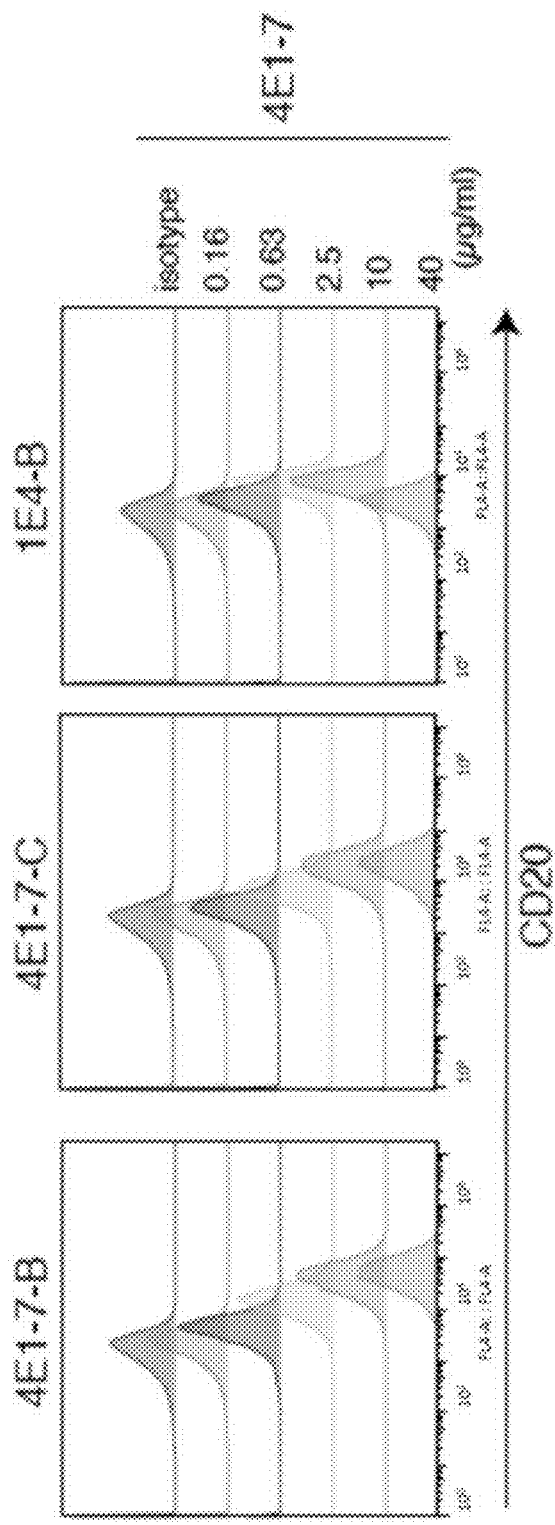
[FIG. 1]

[FIG. 2]
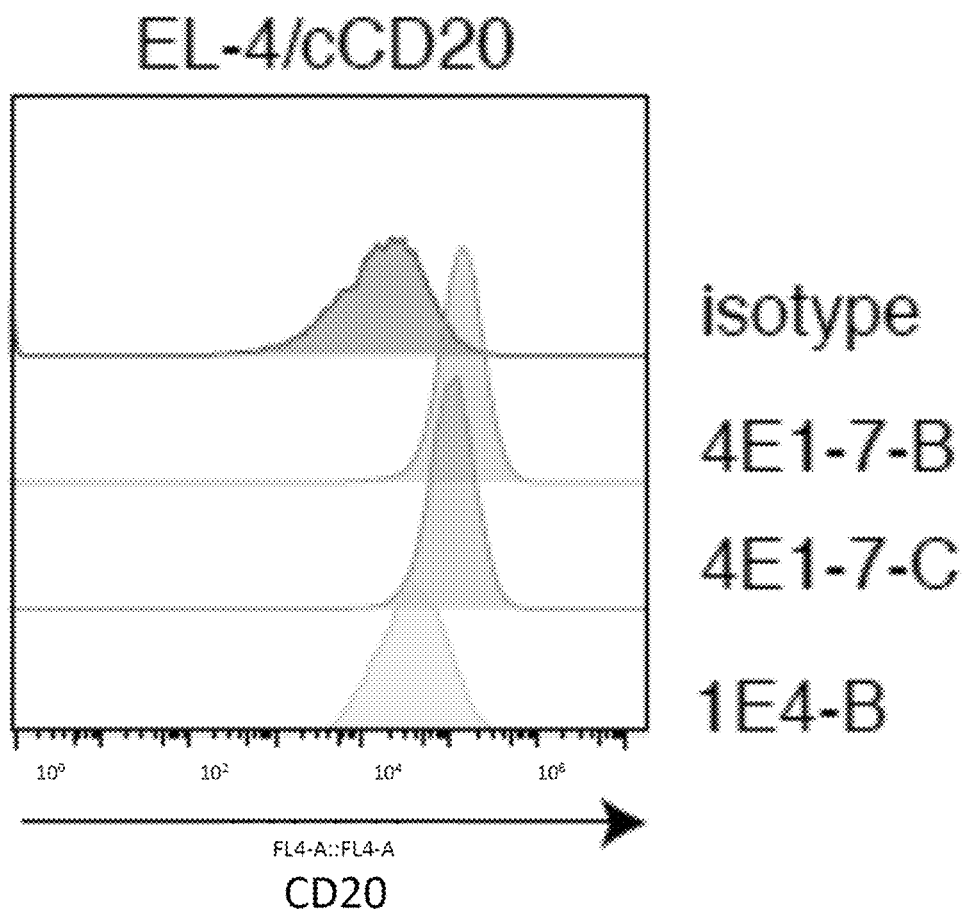

[FIG. 3]
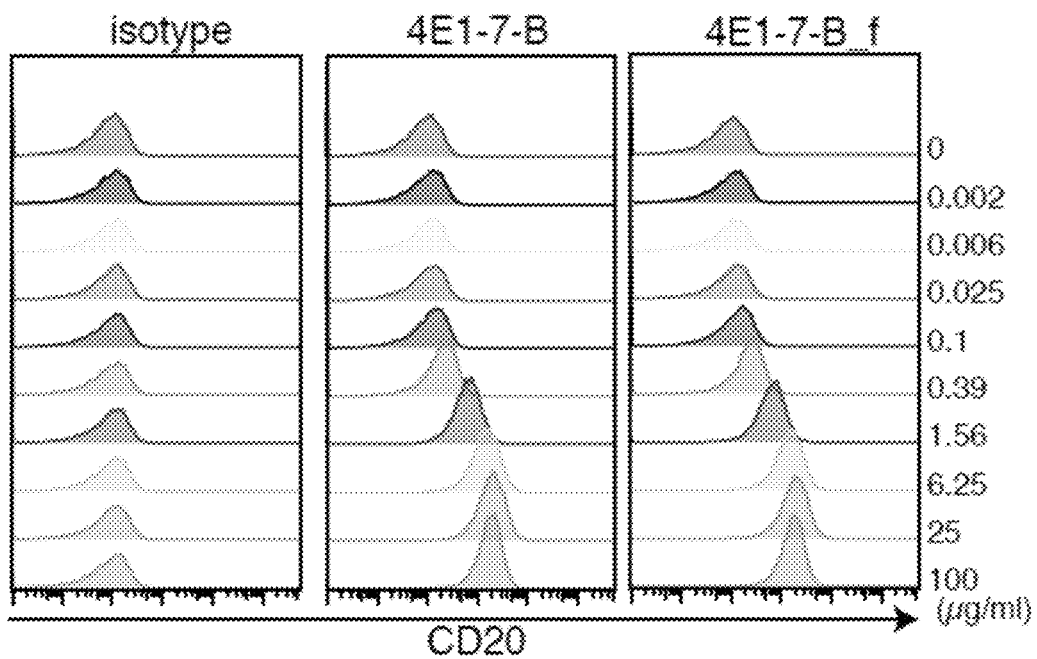

[FIG. 4]
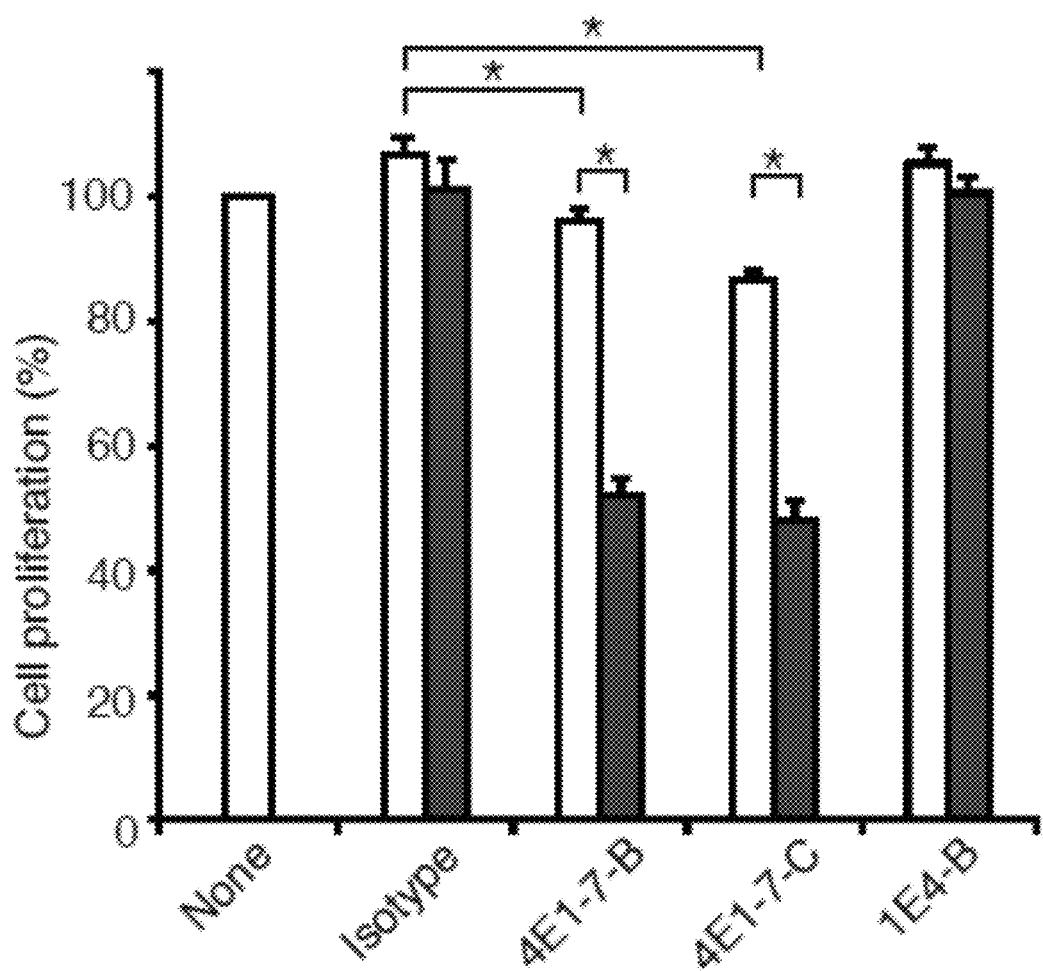

[FIG. 5]
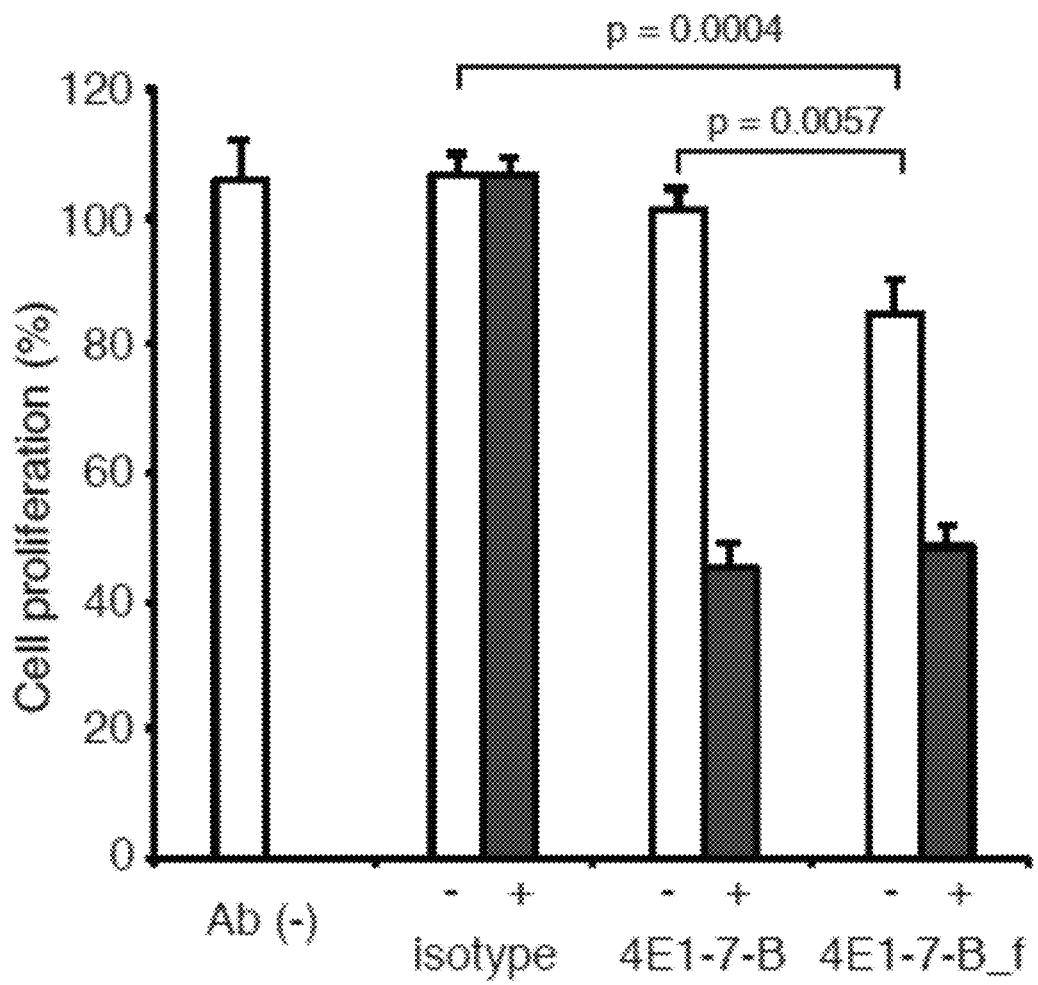

[FIG. 6]
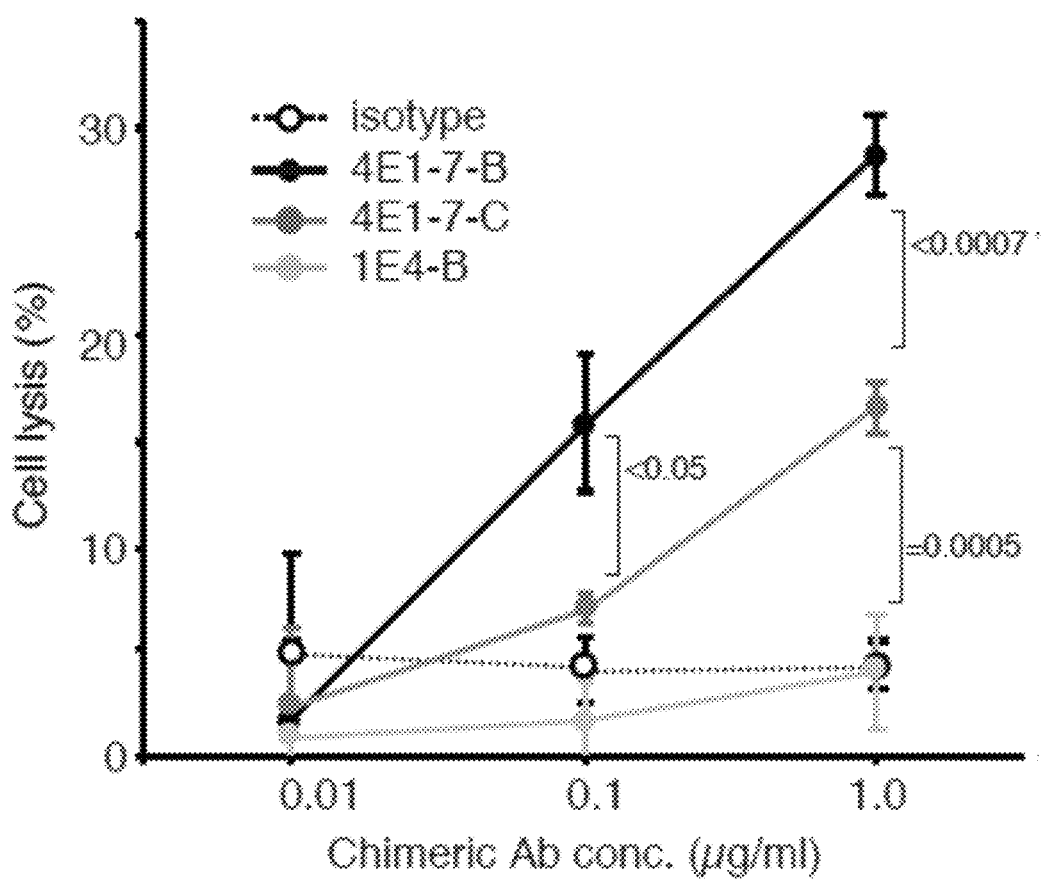

[FIG. 7]
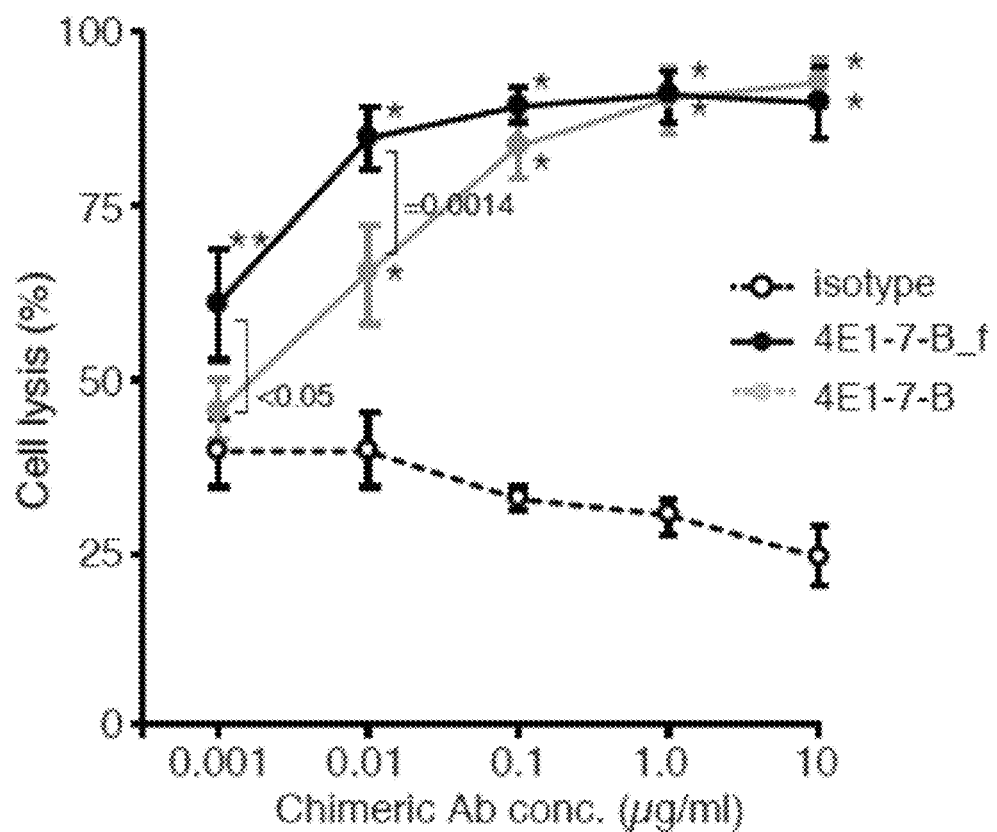

[FIG. 8]
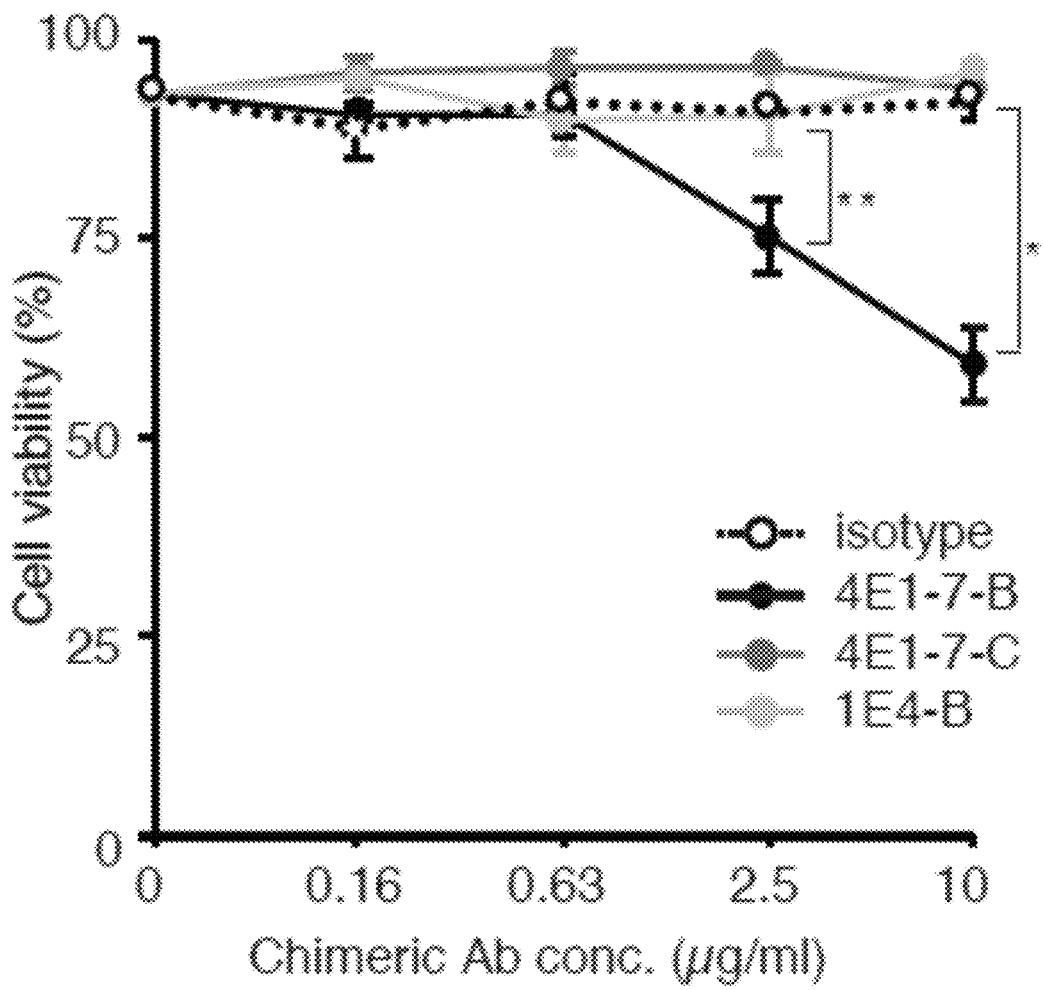

[FIG. 9]
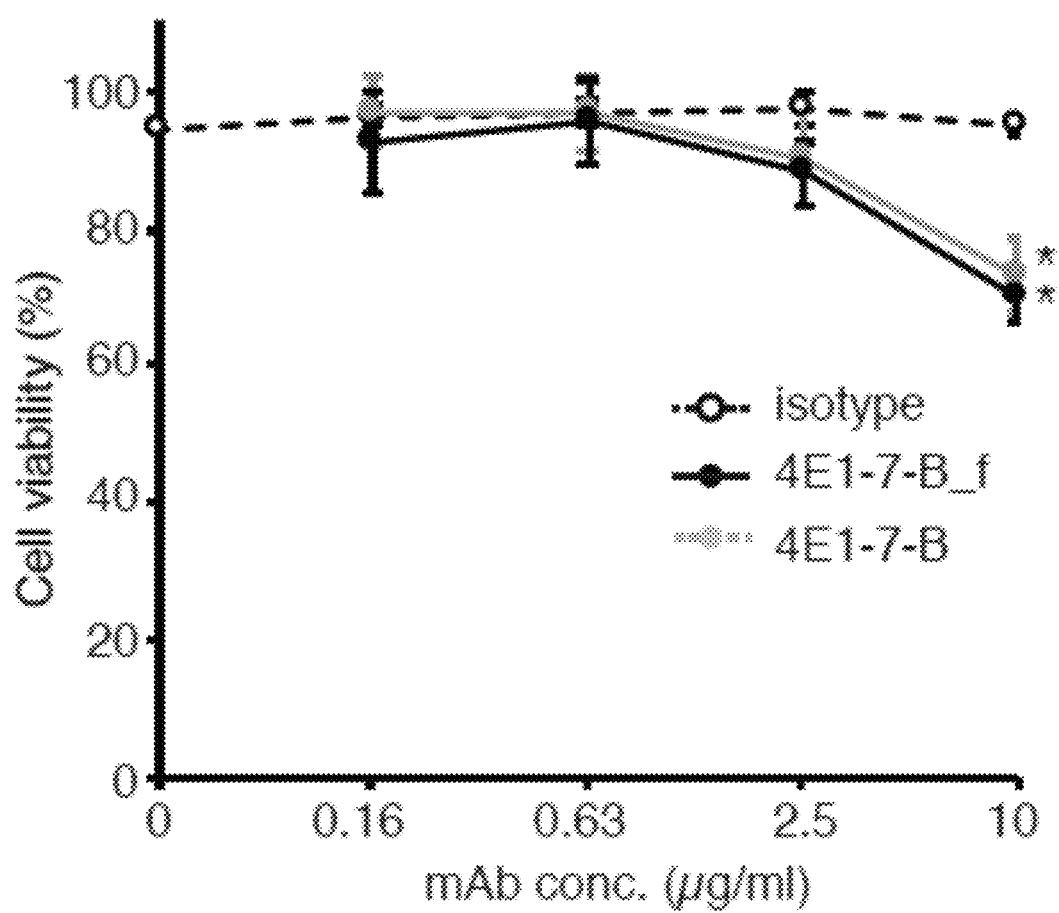

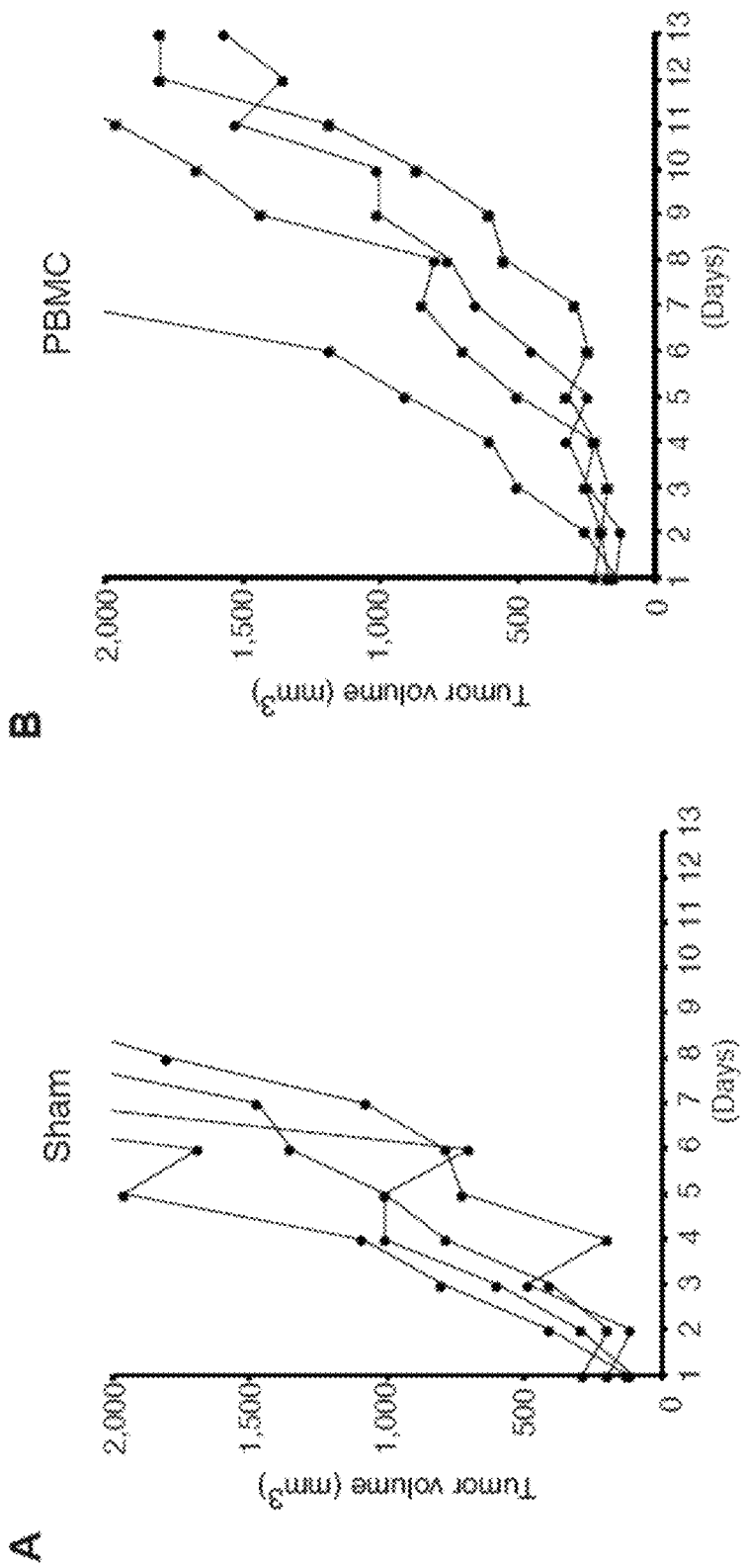
[FIG. 10]

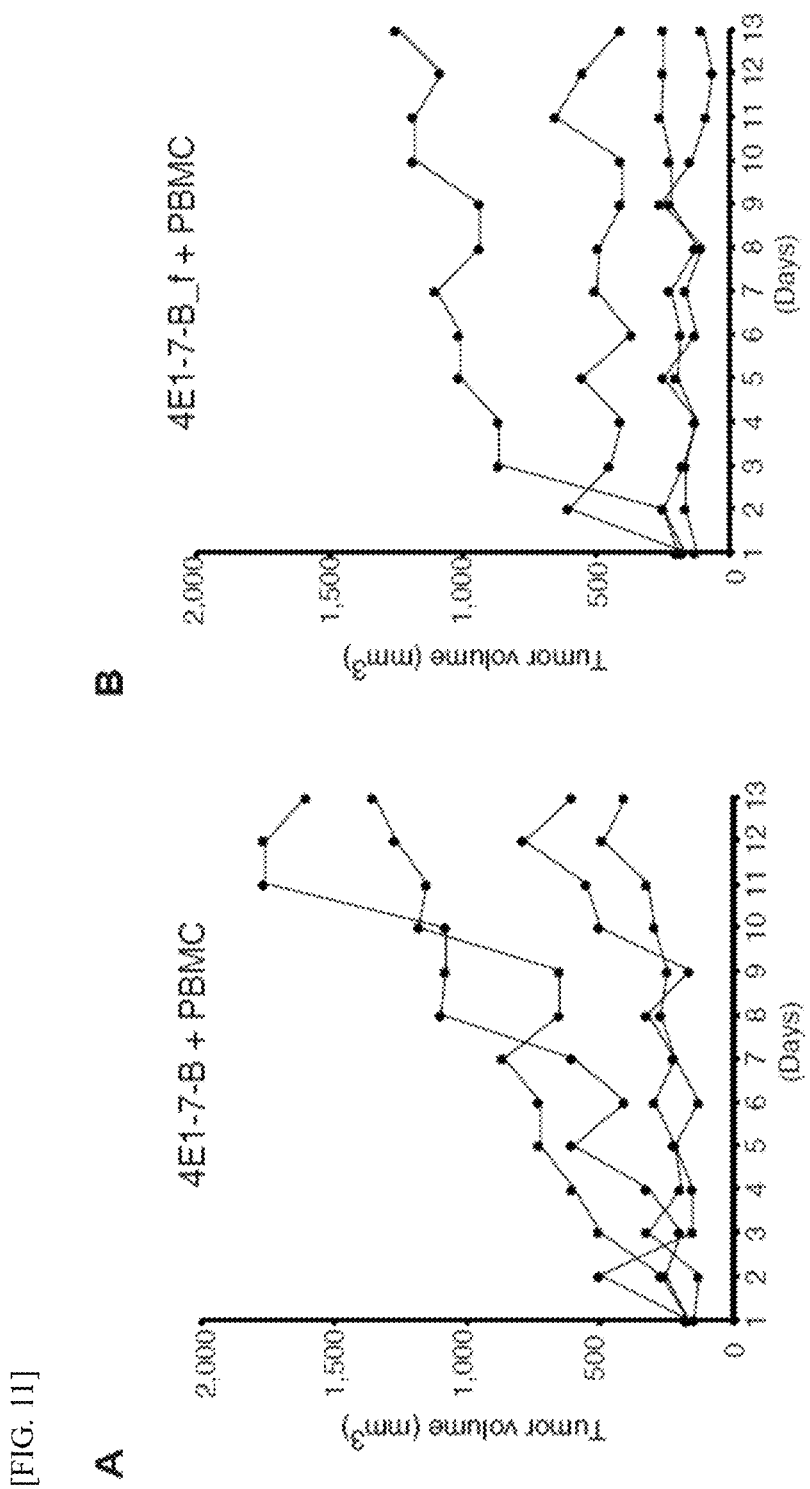
[FIG. 11]

[FIG. 12]
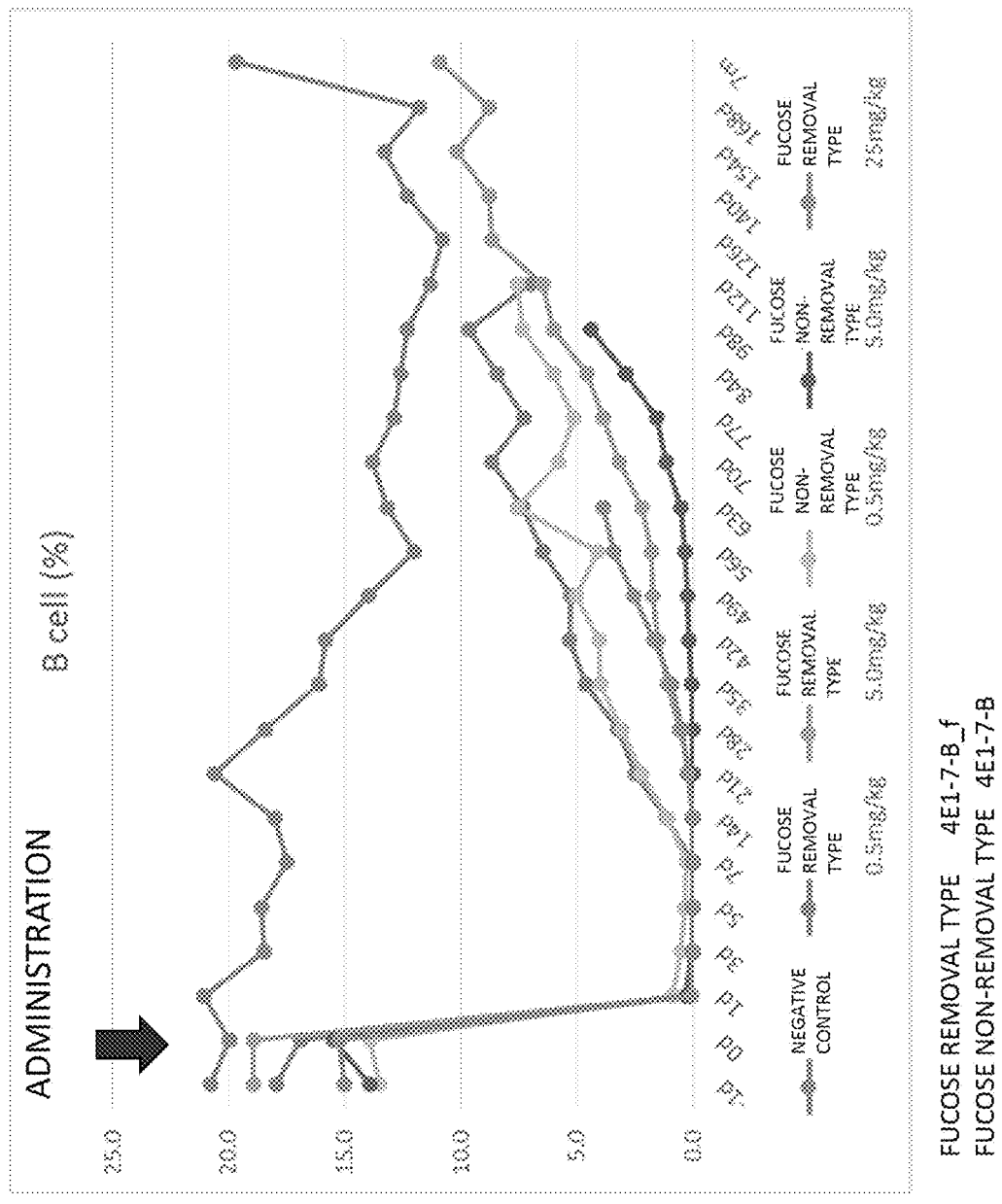

MONOCLONAL ANTIBODY OR ANTIBODY FRAGMENT AGAINST CANINE CD20

REFERENCE TO ELECTRONIC SEQUENCE LISTING

The application contains a Sequence Listing which has been submitted electronically in .XML format and is hereby incorporated by reference in its entirety. Said. XML copy, created on Feb. 22, 2022, is named "2022-02-22_SEQListing_1516-0241PUS1.txt" and is 12,337 bytes in size. The sequence listing contained in this. XML file is part of the specification and is hereby incorporated by reference herein in its entirety.

TECHNICAL FIELD

The present invention relates to a monoclonal antibody or antibody fragment against canine CD20. The present invention more specifically relates to a monoclonal antibody or antibody fragment against canine CD20 having a more excellent effect than existing antibodies.

BACKGROUND ART

CHOP therapy is a multidrug anticancer drug therapy and has been performed for B-cell lymphoma in dogs; however, the 2-year survival rate is as low as 20%, and relapse occurs in most cases after remission, so that B-cell lymphoma cannot sufficiently treated by chemotherapy. Therefore, in recent years, an antibody drug targeting CD20 has been developed as a new method of treatment. For example, Patent Documents 1 and 2 disclose a monoclonal antibody or antibody fragment against an extracellular region of canine CD20 having a heavy chain variable region consisting of a specific amino acid sequence and a light chain variable region consisting of a specific amino acid sequence.

Patent Documents 3 and 4 disclose a humanized monoclonal antibody or an antigen-binding fragment thereof binding to CD20 and containing an L-chain variable region and an H-chain variable region represented by a specific amino acid sequence, and a chimeric or humanized monoclonal antibody or an antigen-binding fragment thereof binding to CD20 and containing an L-chain variable region and an H-chain variable region having CDR1, CDR2, and QQCDR3. Patent Documents 5 to 7 disclose monoclonal antibodies containing a specific amino acid sequence also in the light chain constant region and the heavy chain constant region.

Although various antibodies against CD20 have been developed in this way, the effects vary depending on the antibodies, and it cannot be said that antibodies with excellent effects have been obtained. Therefore, the present inventors developed a rat-dog chimeric antibody against canine CD20 (see Patent Document 8) and attempted to produce a monoclonal antibody against canine CD20 having a more excellent effect in the present invention.

CITATION LIST

Patent Literature

[Patent Document 1] Japanese Unexamined Patent Application Publication (Translation of PCT Application) No. 2014-532649

[Patent Document 2] Japanese Laid-Open Patent Publication No. 2016-13104

[Patent Document 3] Japanese Unexamined Patent Application Publication (Translation of PCT Application) No. 2006-500904

[Patent Document 4] Japanese Laid-Open Patent Publication No. 2009-291197

[Patent Document 5] Japanese Laid-Open Patent Publication No. 2016-41750

[Patent Document 6] Japanese Laid-Open Patent Publication No. 2019-507128

[Patent Document 7] Japanese Laid-Open Patent Publication No. 2015-501146

[Patent Document 8] Japanese Laid-Open Patent Publication No. 2019-26625

SUMMARY OF INVENTION

Technical Problem

A problem to be solved by the present invention is to provide a monoclonal antibody against canine CD20 having a more excellent effect than existing antibodies.

Solution to Problem

As a result of intensive studies for solving the problems of the present invention, the present inventors found that the following monoclonal antibody or antibody fragment against canine CD20 shows a more excellent effect than the existing antibody, thereby completing the present invention. This monoclonal antibody or antibody fragment against canine CD20 is a monoclonal antibody or antibody fragment against canine CD20 that has a heavy chain variable region consisting of an amino acid sequence of SEQ ID NO: 1 or an amino acid sequence in which one or several amino acids are deleted, substituted, or added in the amino acid sequence of SEQ ID NO: 1, and a light chain variable region consisting of an amino acid sequence of SEQ ID NO: 2 or an amino acid sequence in which one or several amino acids are deleted, substituted, or added in the amino acid sequence of SEQ ID NO: 2, and that has a light chain constant region consisting of an amino acid sequence of SEQ ID NO: 3 or an amino acid sequence in which one or several amino acids are deleted, substituted, or added in the amino acid sequence of SEQ ID NO: 3.

Therefore, the present invention for solving the problem relates to a monoclonal antibody, an antibody fragment, etc. against canine CD20 described in (1) to (11) below.

(1) A monoclonal antibody or antibody fragment against canine CD20 comprising: a heavy chain variable region consisting of an amino acid sequence of SEQ ID NO: 1 or an amino acid sequence in which one or several amino acids are deleted, substituted, or added in the amino acid sequence of SEQ ID NO: 1; and a light chain variable region consisting of an amino acid sequence of SEQ ID NO: 2 or an amino acid sequence in which one or several amino acids are deleted, substituted, or added in the amino acid sequence of SEQ ID NO: 2, and comprising a light chain constant region consisting of an amino acid sequence of SEQ ID NO: 3 or an amino acid sequence in which one or several amino acids are deleted, substituted, or added in the amino acid sequence of SEQ ID NO: 3.

(2) The antibody or antibody fragment according to (1), comprising a heavy chain variable region consisting of an amino acid sequence of SEQ ID NO: 4 or 5 or an amino acid sequence in which one or several amino acids are deleted, substituted, or added in the amino acid sequence of SEQ ID NO: 4 or 5.

(3) The antibody or antibody fragment according to (1) or (2), wherein the antibody or antibody fragment is afucosylated.

(4) A composition for reducing B cells in dogs, comprising the antibody or antibody fragment according to any one of (1) to (3) as an active ingredient.

(5) A therapeutic composition for treating a disease caused by an increase in B cells in dogs, comprising the antibody or antibody fragment according to any one of (1) to (3) as an active ingredient.

(6) The therapeutic composition according to (5), wherein the disease is B-cell lymphoma, leukemia, or an autoimmune disease.

(7) A dog B cell detection kit comprising: the antibody or antibody fragment according to any one of claims 1 to 3.

(8) A kit for diagnosing a disease caused by an increase in B cells in dogs, comprising: the antibody or antibody fragment according to any one of claims 1 to 3.

Advantageous Effects of Invention

The present invention enables provision of the monoclonal antibody or antibody fragment against canine CD20 having a more excellent effect than existing antibodies. The present invention also enables provision of a composition for reducing B cells in dogs and a method for reducing B cells in dogs, or a therapeutic composition for treating a disease caused by an increase in B cells in dogs such as B cell lymphoma, leukemia, or an autoimmune disease, and a method for treating a disease caused by an increase in B cells in dogs, using this monoclonal antibody or antibody fragment as an active ingredient.

BRIEF DESCRIPTION OF DRAWINGS

FIG. 1 is a diagram showing that the 4E1-7-B antibody and the 4E1-7-C antibody bind to CLBL-1 cells in a concentration-dependent manner (Example).

FIG. 2 is a diagram showing that the 4E1-7-B antibody and the 4E1-7-C antibody bind to EL-4/cCD20 cells (Example).

FIG. 3 is a diagram showing that the 4E1-7-B_f antibody binds to the CLBL-1 cells in the same manner as the 4E1-7-B antibody (Example).

FIG. 4 is a diagram showing the effects of the 4E1-7-B antibody and the 4E1-7-C antibody on proliferation of the CLBL-1 cells (Example).

FIG. 5 is a diagram showing the effect of the 4E1-7-B_f antibody on proliferation of the CLBL-1 cells (Example).

FIG. 6 is a diagram showing the effects of the 4E1-7-B antibody and the 4E1-7-C antibody on cytolysis of CLBL-1/luc cells (Example).

FIG. 7 is a diagram showing the cytopathic effect of the 4E1-7-B antibody and the 4E1-7-B_f antibody on the CLBL-1/luc cells (Example).

FIG. 8 is a diagram showing the cell death-inducing effects of the 4E1-7-B antibody and the 4E1-7-C antibody on the CLBL-1/luc cells (Example).

FIG. 9 is a diagram showing the cell death-inducing effect of 4E1-7-B antibody and 4E1-7-B_f antibody on CLBL-1/luc cells (Example).

A. FIG. 10 is a diagram showing the influence of administration of PBS on tumor growth in a mouse (Example). B. FIG. 10 is a diagram showing the influence of administration of PBMC on tumor growth in a mouse (Example).

A. FIG. 11 is a diagram showing the influence of administration of the 4E1-7-B antibody and PBMC on tumor growth in a mouse (Example). B. FIG. 11 is a diagram showing the influence of the 4E1-7-B_f antibody and PBMC administration on tumor growth in a mouse (Example).

FIG. 12 is a diagram showing the effect of administration of the 4E1-7-B antibody and the 4E1-7-B_f antibody on $CD21^+B$ cell expression in canine peripheral blood (Example).

DESCRIPTION OF EMBODIMENTS

An "anti-canine CD20 monoclonal antibody or antibody fragment" of the present invention is an antibody or antibody fragment recognizing a canine CD20 molecule and refers to a monoclonal antibody or antibody fragment against canine CD20 that has a heavy chain variable region consisting of an amino acid sequence of SEQ ID NO: 1 or an amino acid sequence in which one or several amino acids are deleted, substituted, or added in the amino acid sequence of SEQ ID NO: 1, and a light chain variable region consisting of an amino acid sequence of SEQ ID NO: 2 or an amino acid sequence in which one or several amino acids are deleted, substituted, or added in the amino acid sequence of SEQ ID NO: 2, and that has a light chain constant region consisting of an amino acid sequence of SEQ ID NO: 3 or an amino acid sequence in which one or several amino acids are deleted, substituted, or added in the amino acid sequence of SEQ ID NO: 3.

In this description, several pieces means 15, 14, 13, 12, 11, 10, 10, 9, 8, 7, 6, 5, 5, 4, 3, or 2 pieces. Several pieces mean 5, 4, 3 or 2 pieces, etc.

The "anti-canine CD20 monoclonal antibody or antibody fragment" of the present invention can bind well to an extracellular region of canine CD20 and can be used for FACS analysis using live canine cells and tissues of dogs and analysis of dynamics etc. of CD20 positive cells through fluorescence microscopy etc.

The "anti-canine CD20 monoclonal antibody or antibody fragment" of the present invention may be a monoclonal antibody or antibody fragment against afucosylated canine CD20.

A "composition for reducing B cells in dogs" of the present invention refers to a composition for reducing B cells in dogs containing the "anti-canine CD20 monoclonal antibody or antibody fragment" of the present invention as an active ingredient. The composition may contain other components in addition to these active ingredients as long as the components are useful for the reduction of B cells in dogs and may further contain a drug such as an anticancer agent or a radionuclide. The composition may contain a pharmaceutically acceptable additive, and examples of such an additive include a solvent such as water, a surfactant, sodium chloride, sodium citrate, anhydrous citric acid, a pH adjuster, etc.

The "therapeutic composition for treating a disease caused by an increase in B cells in dogs" of the present invention refers to a therapeutic composition for treating a disease caused by an increase in B cells in dogs containing the "anti-canine CD20 monoclonal antibody or antibody fragment" of the present invention as an active ingredient.

Examples of such diseases include canine B cell lymphoma caused by an increase in B cells in dogs, leukemia associated with neoplastic transformation of increased B cells, and autoimmune diseases caused by an excessive increase in normal B cells.

For example, when the disease to be treated is B-cell lymphoma, administration of the "therapeutic composition for treating a disease caused by an increase in B cells in dogs" of the present invention to an affected dog allows the active ingredient "anti-canine CD20 monoclonal antibody or antibody fragment" to bind to CD20 overexpressed on the surface of B-cell lymphoma cells, thereby enabling the killing etc. of canine B-cell lymphoma cells through mechanisms such as Antibody-Dependent-Cellular-Cytotoxicity (ADCC) activity, Complement-Dependent Cytotoxicity (CDC) activity, and apoptosis induction.

The "therapeutic composition for treating a disease caused by an increase in B cells in dogs" of the present invention may be a composition composed of the active ingredient "anti-canine CD20 monoclonal antibody or antibody fragment" or may be a composition further containing other components and drugs such as an anticancer agent and a radionuclide in addition to these active ingredients.

The composition may have any form of agent as long as the form is effective in treating a disease caused by an increase in B cells in dogs and may be provided as a liquid or powder for intravenous injection or infusion, a tablet, a capsule, etc.

A method of treatment using the composition for treatment of the present invention may include, for example, administering the composition at intervals of about once a week by intravenous injection, infusion, etc. so that 1 to 10 mg/kg of the "anti-canine CD20 monoclonal antibody or antibody fragment" of the present invention is achieved.

A "dog B cell detection kit" of the present invention refers to a kit for detecting whether dog B cells are contained in a sample by using the "anti-canine CD20 monoclonal antibody or antibody fragment" of the present invention. A "kit for diagnosing a disease caused by an increase in canine B cells" of the present invention refers to a kit for diagnosing whether a dog of interest is affected by a disease caused by an increase in canine B cells such as canine B cell lymphoma, leukemia, and autoimmune diseases.

These kits include at least the "anti-canine CD20 monoclonal antibody or antibody fragment" of the present invention as one of the constituents.

The "anti-canine CD20 monoclonal antibody or antibody fragment" included in the kit of the present invention may be unlabeled or may be labeled with a conventionally known labeling substance such as an enzyme, a fluorescent substance, or a radioactive substance.

Examples of enzymes serving as such labeling substances include peroxidase, β-galactosidase, alkaline phosphatase, glucose oxidase, acetylcholinesterase, lactate dehydrogenase, amylase, etc. Examples of the fluorescent substance include fluorescein isothiocyanate (FITC), tetramethylrhodamine isothiocyanate (TRITC), Cy3, Cy5, R-phycoerythrin, B-phycoerythrin, Alexa Fluor 488 or Alexa Fluor 647, etc. and examples of the radioactive substance include trithium, iodine-125, iodine-131, etc. Biotin, streptavidin, etc. may be used.

When the "dog B cell detection kit" and "kit for diagnosing a disease caused by an increase in canine B cells" of the present invention are used, any of conventionally known reagents, devices, etc. useful for detecting canine B cells and diagnosing a disease caused by an increase in canine B cells may be used.

Lymphocytes are isolated from living tissues such as blood of a dog to be diagnosed, and the "anti-canine CD20 monoclonal antibody or antibody fragment" included in these kits is allowed to act on the lymphocytes. By observing the dynamics and morphology of CD20-positive cells by FACS analysis, fluorescence microscopy, etc., the detection of canine B cells and the diagnosis of a disease caused by an increase in canine B cells can be performed.

By using these kits, a living cell can be used as an object to be detected or diagnosed, and cell fixation operation etc. are not required, so that detection or diagnosis can accurately and easily be performed.

Examples of the present invention fill hereinafter be described; however, the present invention is not limited thereto.

EXAMPLES

Preparation of Anti-Canine CD20 Monoclonal Antibody

Sample Preparation

1) Preparation and Culture of Cells (1) A Canine B Cell Lymphoma Cell Line Used were CLBL-1 (Distributed by Dr. Rutgen (University of Veterinary Medicine Vienna), and Canine T Cell Lymphoma Cell Lines Used Were UL-1 Cells (Yamaguchi University), Nody-1 Cells (Yamaguchi University), Ema Cells (Yamaguchi University), CLK Cells (Yamaguchi University), CLC Cells (Yamaguchi University), CLGL-90 (Distributed by Dr. Wellman (Ohio State University)), 17-71 (Distributed by Dr. Kurzman (Wisconsin University)), a Human Lymphoblastoid Cell Line (Jurkat Cell) (ATCC: American Type Culture Collection), a Mouse Lymphoblastoid Cell Line (EL-4 Cells) (ATCC), and a Mouse Myeloma Cell Line (P3U1 Cell) (ATCC). All of These Cells were Cultured by Using a Humidified Incubator (5% $CO_2$, 37° C.) in R10 Medium (RPMI 1640 Medium Supplemented with 10% FBS, 100 U/ml Penicillin, 100 µg/ml Streptomycin, and 55 µM β-Mercaptoethanol).

A rat kidney cell line (NRK cell) (Cosmo Bio), a human kidney cell line (HEK293T cell) (Cosmo Bio) and packaging cell lines (PLAT-E cell line, PLAT-gp cell line, and PG13 cell line) (Cosmo Bio) were all cultured by using a humidified incubator (5% $CO_2$, 37° C.) in D10 medium (DMEM medium supplemented with 10% FBS, 100 U/ml penicillin, 100 µg/ml streptomycin, and 55 M β-mercaptoethanol).

Canine peripheral blood mononuclear cells (PBMCs) were isolated from a healthy beagle dog at the Yamaguchi University Animal Medical Center by using Lymphoprep™ (Axis-Shield Ltd.), a density gradient medium for mononuclear cell separation, in accordance with a conventional method. Some of the isolated PBMCs were directly subjected to flow cytometry staining or inoculated into mice as effector cells. The cells were cultured in a humidified incubator (5% $CO_2$, 37° C.) for 7 days in R10 medium supplemented with 1,000 IU/ml human recombinant IL-2 (Proleukin®, Chiron Therapeutics, Emeryville) for use in the ADCC assay as lymphokine-activated killer (LAK) effector cells.

(2) Tumor Cells

Primary lymphoma cells were obtained from enlarged lymph nodes in a dog visited the Yamaguchi University Animal Medical Center for diagnosis and treatment. After confirming that all the samples contained 90% or more of lymphoblasts by cytodiagnosis, the samples were centrifuged and used for flow cytometric staining with the consent of the owner.

2) Molecular Cloning

Molecular cloning of canine CD20 (hereinafter, sometimes simply referred to as CD20), the IgG heavy chain constant region, and the light chain constant region was performed by using the cervical lymph node or spleen of a healthy beagle dog.

The CD20, IgG heavy chain region, and IgGκ light chain region were amplified by PCR using the nucleotide sequence of canine CD20 (NCBI registration number: AB210085) as a template and primers described in Table 1. All the primers used in this example were obtained through consignment.

The PCR was performed with KOD DNA polymerase-Plus (TOYOBO) by a denaturation step at 95° C. for 2 minutes, followed by 30 cycles of 95° C. for 30 seconds, 56° C. for 30 seconds, and 72° C. for 1 to 1.5 minutes. Subsequently, incubation was performed at 72° C. for 10 minutes in the presence of Taq DNA polymerase.

The amplification product was linked to a vector by using TOPO TA cloning kit (Thermo Fisher Scientific), and the plasmid linked to CD20 was named pCR-cCD20; the plasmid linked to IgGB and the plasmid linked to IgGC of the plasmids linked to the IgG heavy chain region were named pCR-HB and pCR-HC, respectively; and the plasmid linked to the IgGκ light chain region was named pBS-κ. The base sequences of the amplification products in these plasmids were analyzed by using the ABI PRISM 3100-Avant sequencer (DNA Core Facility, Genetic Research Center, Yamaguchi University).

TABLE 1

| amplification object | SEQ ID NO | primer name | sequence |
| --- | --- | --- | --- |
| canine CD20 | 6 | YTM19 | GCGCGGCCGCTCTCAGGAGTTCAGAGGGTGAG |
|  | 7 | YTM20 | CAGAATTCTCAGGAAACAGGGGTGGATA |
| IgG heavy chain region | 8 | YTM48 | CCAGGTGACCCCATTCAGTGCTCAGGACAC |
|  | 9 | YTM49 | GGGTGGGGGGCTTGCTGGGTGCCGGGCG |
| IgGκ light chain region | 10 | YTM148 | CACTGTCCGTGTCTGTCAGC |
|  | 11 | YTM149 | CCAAGGCCTGAGCTAGGAG |

3) Preparation of Expression Plasmid (1) Preparation of Canine CD20 Expression Plasmid Tagged with FLAG The pCR-cCD20 prepared in 2) was amplified by PCR using the YTM1233 primer and YTM1234 primer described in Table 2, and the next PCR was then performed by using the YTM1233 primer and YTM838 primer.

The amplified product was cleaved with BamHI and linked to the BamHI and SnaBI sites of pMXs-IP (distributed by Dr. Kurzman (University of Wisconsin)) to obtain pMx-IP-cCD20-flag #4. A BamHI-HincII fragment of this pMx-IP-cCD20-flag #4 was inserted into the BamHI-HpaI site of CSII-CMV-MCS-IRES2-Bsd (distributed by DNA Bank, Ibaraki, RIKEN BioResource Center) to prepare CSII-CMV-cCD20-Flag-IP #4 as a lentivirus expression plasmid.

(2) Preparation of Retrovirus Expression Plasmid for Luciferase

The luciferase gene was amplified by using the primers YTM912 and YTM913 described in Table 2, cleaved with AgeI, and linked to the HindIII-EcoRV site of the pBluescript SK(–) plasmid (Promega KK) having the HindIII-AgeI fragment of pGL4.50luc2 to obtain PBS-luc2. This pBS-luc2 XhoI-NotI fragment was excised and inserted into the XhoI-NotI site of pMX-IP (distributed by Dr. Kurzman (University of Wisconsin)) to prepare pMX-luc-IP #9 as a retrovirus expression plasmid for luciferase.

TABLE 2

| SEQ ID NO | primer name | sequence |
| --- | --- | --- |
| 12 | YTM1233 | ACGGATCCATGACAACACCCAGAAATTCAATG |
| 13 | YTM1234 | GTCGATGTCATGATCTTTATAATCAGGGATGCTGTCGT |
| 14 | YTM838 | TCACTACTTGTCATCGTCATCCTTGTAGTCGATGTCATG |
| 15 | YTM912 | GCTAAGGTGGTGGACTTGGA |
| 16 | YTM913 | CCGCCCCGACTCTAGAATTA |

4) Establishment of Cell Line

The pMx-IP-cCD20-flag #4 having pCAGGS-VSVG prepared in (1) of 3) described above, or CSII-CMV-cCD20-Flag-IP #4 having pCVSVG and p8.9QV prepared in (1) of 3) described above was introduced into the packaging cell line PLAT-gp or HEK293T cells.

NRK cells, Jurkat cells, and EL-4 cells are infected by using the prepared retrovirus and cultured in the presence of puromycin (10 μg/ml and 4 μg/ml) to obtain NRK/cCD20 cells, Jurkat/cCD20 cells, and EL-4/cCD20 cells as canine CD20 overexpressing cells.

To obtain a CLBL-1 cell line expressing the luciferase gene, the pMX-luc-IP #9 prepared in (2) of 3) described above was introduced into PLAT-E cells. The produced retrovirus was added to a PG13 packaging cell line (PG13/luc), the retrovirus produced by PG13 was further added to CLBL-1 cells, and the CLBL-1/luc cells were then selected and obtained in the presence of 0.5 μg/ml puromycin.

5) Preparation of Monoclonal Antibody

As in the prior patent application of the present inventors (Japanese Laid-Open Patent Publication No. 2019-26625), a 4E1-7 antibody was prepared as a monoclonal antibody against canine CD20.

Specifically, SD rats were immunized with the NRK/cCD20 cells established in 4). Specifically, NRK/cCD20 cells were mixed with Titer Max® Gold (CytRx) serving as an adjuvant and subcutaneously injected into 6-week-old Sprague-Dawley (SD) rats (Kyudo). The rats were allowed to live in a place free of specific pathogens based on the Yamaguchi University Animal Welfare Guidelines. Ten days after immunization, $1 \times 10^7$ cells were further injected into the footpad, and two days later, the popliteal lymph nodes were resected. Lymphocytes were collected from the lymph nodes and fused with P3U1 cells of a mouse myeloma cell line.

The obtained hybridoma culture supernatant was collected and screened for a hybridoma producing a monoclonal antibody reactive to NRK/cCD20 cells and Jurkat/cCD20 cells by flow cytometry (FACS). A single hybridoma clone (4E1-7) was finally isolated by the limiting dilution method, and the medium was then adapted to serum-free medium, hybridoma SFM (Thermo Fisher Scientific K.K.). The supernatant was pooled, and the monoclonal antibody was purified by a HITRAP PROTEIN A HP™ column (GE Healthcare UK Ltd), a protein A affinity column for antibody purification. Finally, the subclass of the antibody as determined by flow cytometry.

As a result, it was confirmed that the subclass of the obtained anti-canine CD20 monoclonal antibody (4E1-7) was rat IgG2a. The 4E1-7 reacted with NRK/cCD20 cells, did not react with NRK cells, bound to the canine B-cell lymphoma cell line CLBL-1 in a concentration-dependent manner, and did not bind to other canine lymphoma cell lines (GL-1, CL-1, Ema, UL-1, CLC, CLK, CLGL90 and 17-71 cell lines). Furthermore, the 4E1-7 reacted with Jurkat/cCD20 cells and did not react with Jurkat cells.

An appropriate molecular weight (37 kDa) band of canine CD20 was detected in the cell lysate of Jurkat/cCD20 cells by anti-Flag antibody. Similar bands were also detected in 4E1-7 immunoprecipitated cell lysate from Jurkat/cCD20 cells. However, 4E1-7 did not detect bands in the cell lysate from Jurkat/cCD20 cells, and this suggests that 4E1-7 recognizes non-linear epitopes.

From these results, it was confirmed that 4E1-7 is a monoclonal antibody specific for the canine CD20 molecule.

6) Preparation of Chimeric Anti-CD20 Antibody Expression Vector

To obtain the variable regions of the heavy chain and light chain of the monoclonal antibody obtained in 5), 5'RACE of a hybridoma clone (4E1-7) was performed by using a gene-specific primer.

Specifically, total RNA such as 4E-7 was extracted and reverse-transcribed by using Superscript II (Thermo Fisher Scientific KK) and the gene-specific primer YTM171 (for κ-light chain) described in Table 3. The sequences of the primers used are described in Table 3 below.

A YTM172 (for heavy chains) primer was used for 5'RACE. To the 5' end of the obtained cDNA, dCTP was added by using terminal transferase (TOYOBO), and a PCR reaction was performed by using primers YTM166 and YTM171 or YTM172 having poly G at the 3' end. This amplification product was further amplified by using primers YTM166 and YTM173 or YTM174.

The PCR product was linked to the SmaI site of the pBluescript SK(-) plasmid (Promega KK), and the base sequence was determined by a gene analyzer (ABI PRISM 3100-Avant sequencer (Yamaguchi University Genetic Research Center DNA Core Facility)).

A 4E1-7 (κ chain) variable region (SEQ ID NO:2) and a canine IgG light chain (K chain) constant region (pBS-κ) (SEQ ID NO:3) were assembled by overlap PCR and linked to a pCAGGS-MCS vector to obtain pCAGGS-4E1-7VκCκ #25.

A 4E1-7 (heavy chain) variable region (SEQ ID NO:1) and an IgG-B (pBS-HB) constant region (SEQ ID NO: 4) or an IgG-C(pBS-HC) constant region (SEQ ID NO:5) of the canine IgG heavy chain were assembled by overlap PCR and linked to the pCAGGS-MCS vector to obtain pCAGGS-4E1-7VH-CHB #31 or pCAGGS-4E1-7VH-CHC #6.

To obtain a known antibody (1E4-B) as a comparison of antibody functions, variable regions of the 1E4 heavy chain and the 1E4 light chain were synthesized based on the description of Reference 1 below and Patent Document 1 (GenScript).

The plasmid encoding the chimeric antibody 1E4-B was constructed by overlap PCR of the 1E4 scFV plasmid, the canine IgG light chain (κ chain) constant region (pBS-κ) (SEQ ID NO: 3), or the IgG-B (pBS-HB) constant region (SEQ ID NO:4) of the canine IgG heavy chain.

Reference 1

Rue S M, Eckelman B P, Efe J A, Bloink K, Deveraux Q L, Lowery D, et al. Identification of a candidate therapeutic antibody for treatment of canine B-cell lymphoma. Vet Immunol Immunopathol 2015; 164:148-159.

TABLE 3

| SEQ ID NO | primer name | sequence |
|---|---|---|
| 17 | YTM171 | TGCCATCAATCTTCCACTTGACA |
| 18 | YTM172 | AAYTTTCTTGTCCACCTTGG |
| 19 | YTM166 | GGCCACGCGTCGACTAGTACGGGGGGGGGGGGGGG |
| 20 | YTM173 | GTTGTTCAWGARGCACACGACTGAGGCA |
| 21 | YTM174 | AATAGCCCTTGACCAGGCAT |

7) Manufacture and Purification of Antibody

Each of the expression plasmids obtained in 6) was introduced into HEK293 cells or PDIS-5 (core fucose KO CHO-S) cells (Sigma-Aldrich Japan) by using an xpi293 expression system (Thermo Fisher Scientific KK).

After introducing each of the plasmids, the supernatant of the cultured cells was collected, purified by using a HITRAP PROTEIN A HP™ column (GE Healthcare), a protein A affinity column for antibody purification, and further desalted using a PD10 column (GE Healthcare).

The purified antibodies were indicated by 4E1-7, the antibody having the IgG-B constant region of the canine IgG heavy chain was indicated by 4E1-7-B, the antibody having the IgG-C constant region was indicated by 4E1-7-C, and the antibody for comparison was indicated by 1E4-B. The afucosylated antibody was indicated by 4E1-7-B_f.

8) Flow Cytometry

After the cells cultured in 7) were collected and washed with a buffer solution (PBS containing 2% FBS and 0.1% $NaN_3$), $2 \times 10^5$ cells were stained by a first antibody (PE-labeled anti-CD21 antibody (Biorad, Hercules, CA)). Rat IgG2a (BioLegend Japan) was used for isotype control. The cells were then stained by a secondary antibody (PE-labeled anti-rat IgG (SouthernBiotech), Dylight 649-labeled anti-rat IgG (BioLegend), or Alexa 647-labeled anti-canine IgG (Jackson Immunoresearch).

To determine the subclass of 4E1-7, NRK/cCD20 cells were first stained by the anti-canine CD20 antibody (4E1-7) and then stained by biotin-labeled anti-rat IgG-κ or anti-rat IgG-λ. Subsequently, the anti-rat IgG1 antibody, the anti-rat IgG2a antibody, or the anti-rat IgG2b antibody was added and incubated with streptavidin-PE (ebioscience). After the reaction, the results were analyzed by BD Accuri C5 (BD Biosciences) with FlowJo v.10 software (Tree Star Inc.).

As a result, as shown in FIG. 1, it was confirmed that both the 4E1-7-B and 4E1-7-C antibodies bind to the CLBL-1 cell line in a concentration-dependent manner. Additionally, as shown in FIG. 2, it was confirmed that these antibodies bind to EL-4/cCD20 cells more strongly than 1E4-B.

Furthermore, as shown in FIG. 3, 4E1-7-B_f also bound to the CLBL-1 cell line in the same manner as 4E1-7-B.

9) Western Blotting and Immunoprecipitation

The cells cultured in 7) were lysed in a 1% NP40 buffer for 15 minutes at 4° C. The cell lysate was centrifuged at 15,000×g at 4° C. for 15 minutes. The protein concentration was examined by the Pierce BCA protein assay (Thermo Fisher Scientific K.K.) and used for Western blotting and immunoprecipitation.

Based on the description in Reference 2, SDS-PAGE and Western blotting were performed with a conventional method. The anti-Flag M2 antibody (Sigma-Aldrich Japan) and the anti-actin mouse monoclonal antibody (Sigma-Aldrich Japan) were used as a primary antibody, and HRP-binding anti-rat Ab (Zymed) or anti-mouse Ab (Biorad) was used as a secondary antibody. After the reaction, the membrane was immersed in a Western Lightning chemiluminescent reagent (Perkin Elmer), and the results were confirmed by using Luminescent Image Analyzer LAS 3000 mini (FUJIFILM).

For immunoprecipitation, the cell lysate prepared above was pre-clarified with 10 µl of protein A/G agarose (Santa Cruz Biotechnology, Inc.) at 4° C. for 1 hour while being rotated. With 10 µl of this supernatant, 1 µg of a mixture of each antibody obtained in 7) and protein A/G agarose was mixed overnight at 4° C. The immunoprecipitate was then washed 3 times with PBS and used for Western blotting as described above.

Reference 2

Okawa T, Kurio Y, Morimoto M, Hayashi T, Nakagawa T, Sasaki N, et al. Calreticulin expression in neoplastic versus normal dog mammary glands: A cDNA subtraction-based study. Res Vet Sci 2012; 92:80-91.

10) Cell Proliferation Assay

The CLBL-1 cells ($2\times10^4$ cells/100 µl) were seeded on a 96-well microtiter plate containing each antibody obtained in 7). The CLBL-1 cells and each antibody were then incubated on ice for 15 minutes, and 10 µg/ml anti-dog IgG Fc-specific antibody (Jackson Immunoresearch) was then added. After this was incubated for 72 hours, 10 µl of CCK-8 solution (DOJINDO) was added to each well and further incubated for 2 hours. Subsequently, the absorbance at 450 nm was measured with an ARVO X4 microplate reader (Perkin Elmer).

As a result, as shown in FIG. 4, when CLBL-1 cells were treated with 4E1-7-B and 4E1-7-C, very weak suppression of cell proliferation was exhibited as compared with 4E1-7. This effect was enhanced by cross-linking of 4E1-7-B and 4E1-7-C with the anti-canine antibody. On the other hand, 1E4-B exhibited no direct cell killing even in the presence of the anti-canine IgG crosslinking.

As shown in FIG. 5, 4E1-7-B_f exhibited suppression of cell proliferation of CLBL-1 cells, which was enhanced by the addition of anti-canine IgG. The cell proliferation inhibition rate was slightly higher in the 4E1-7-B_f-treated CLBL-1 cells.

11) ADCC Assay

The CLBL-1/luc cells ($5\times10^3$ cells/well) were seeded on a 96-well microtiter plate containing either rat IgG2a (ebio-science) or each of the antibodies obtained in 7). After this was incubated on ice for 15 minutes, PBL stimulated with IL-2 serving as effector cells was added in an effector/target ratio of 20:1. The culture was further incubated for 4 hours and then cytolyzed by using the ONE-GLO™ luciferase assay system (Promega KK). Luciferase activity was detected by the ARVO X4 system (PerkinElmer).

Cell-mediated cytotoxicity was calculated in accordance with the following equation. The percentage of dissolution was determined by averaging 3 wells.

Specific dissolution (%)=(natural death RLu−test RLU)/(natural death RLu−maximum killing RLU) [Math. 1]

As a result, as shown in FIG. 6, both 4E1-7-B and 4E1-7-C induced cytolysis of the CLBL-1/luc cells in a concentration-dependent manner. This activity was stronger in 4E1-7-B than in 4E1-7-C. In contrast, the 1E4-B antibody exhibited no ADCC activity.

Furthermore, as shown in FIG. 7, both the 4E1-7-B and 4E1-7-B_f antibodies induced cytopathic effects in the CLBL-1/luc cells; however, 4E1-7-B_f exhibited a cytotoxic effect that was almost 10 times higher than that of 4E1-7-B.

12) CDC Assay

The CLBL-1 cells ($1\times10^5$ cells/100 µl) were seeded on a 96-well microtiter plate containing either rat IgG2a antibody or 4E1-7 obtained in 7). After this was incubated on ice for 20 minutes, LOW-TOX™-H rabbit complement (CEDA-LANE; final concentration 1:40), a bacterial endotoxin standard for assay calibration, was added to each well and further incubated for 90 minutes. Subsequently, live cells and dead cells were counted by a trypan blue dye exclusion assay.

The CLBL-1/luc1 cells ($1\times10^5$ cells/100 µl) were used and seeded on a 96-well microtiter plate containing either 4E1-7-B or 4E1-7 and treated in the same manner as above, and live cells and dead cells were examined by the method described in the ADCC assay of 11).

As a result, as shown in FIG. 8, 4E1-7-C did not induce cell death of the CLBL-1/luc cells as with 1E4-B; however, it was confirmed that 4E1-7-B induced cell death in a concentration-dependent manner.

As shown in FIG. 9, it was confirmed that both 4E1-7-B and 4E1-7-B_f induced cell death in a concentration-dependent manner.

13) Apoptosis Assay

The CLBL-1 cells ($1\times10^5$ cells/500 µl) were seeded on a 24-well plate containing either rat IgG2a or 4E1-7 antibody. After incubating for 72 hours, the cells were stained by FITC Annexin V Apoptosis Detection Kit I (BD Bioscience) and analyzed by flow cytometry.

14) In Vivo Test (Mouse)

Six-to-eight-week-old NOD.CB17-Prkdcscid/J (NOD/SCID) mice (Charles River Laboratories, Japan, Inc.) were allowed to live in a place free of specific pathogens. The CLBL-1 cells ($1\times10^6$ cells/30 µl PBS) were subcutaneously transplanted into the flank of the NOD/SCID mouse. After inoculation, tumor size (two vertical dimensions) was measured daily with calipers. Tumor volume was calculated in accordance with the following equation. When the tumor reached 150 to 250 mm³, each antibody (150 µg/500 µl PBS)

obtained in 7) was intraperitoneally injected every 4 days. Along with the antibody injection, dog PBMCs (5×10⁶ cells) freshly isolated from a healthy beagle dog were suspended in 60 μl of PBS and injected around the tumor to complement the NK cell activity. Mice were sacrificed when the tumor reached 2,000 mm³ or after 13 days from the start of treatment.

$$\text{Tumor volume (mm}^3\text{)} = \frac{1}{2} \times \text{length (mm)} \times \text{width}^2 \text{ (mm}^2\text{)} \qquad \text{[Math. 2]}$$

As a result, as shown in FIGS. 10A and 10B, a slight delay in tumor growth was exhibited in the mice to which only PBMC was administered (FIG. 10B) as compared with the mice to which only PBS was administered as a control (FIG. 10A). It was also confirmed that tumor growth was delayed in two of the four mice to which 4E1-7-B and PBMC were administered (FIG. 11A) and that tumor growth was suppressed in all the four mice to which 4E1-7-Bf and PBMC were administered (FIG. 11B).

15) In Vivo Test (Dog)

Healthy beagle dogs (Nippon Zenyaku Kogyo Co., Ltd.) were divided into 4 groups (4 dogs in each group), and 4E1-7-B or 4E1-7-B_f obtained in 7) was administered in 0.5 mg/kg, 5.0 mg/kg, or 25 mg/kg by intravenous injection. The percentage of CD21⁺B cells in peripheral blood was monitored by flow cytometric analysis (Animal Allergy Clinical LABORATORIES).

On Days 14 and 28 after antibody administration, lymph nodes were obtained from one dog in each group, sliced to a thickness of 3 μm, stained with anti-CD79a antibody (clone HM57, dilution 1:50, Dako), and subjected to immunohistopathological analysis.

As a result, as shown in FIG. 12, the percentage of the CD21⁺B cells on Day 1 after administration decreased to almost zero regardless of which antibody was administered, and the dogs did not have the CD21⁺B cells on Day 3 after administration.

In the dogs in the group to which 0.5 mg/kg of 4E1-7-B was administered, this condition continued until Day 7 after the administration, and even on Day 14 after the administration, one dog still exhibited no CD21⁺B cells. In the dogs in the group to which 5.0 mg/kg of 4E1-7-B was administered, the CD21⁺B cells were not exhibited on Day 14 after administration, and although a slight increase was observed in 2 dogs on Day 21 after administration, one dog did not have CD21⁺B cells even on Day 28 after administration. In all the groups, the percentage of the CD21⁺B cells did not recover to the original percentage until Day 119 after administration, and the value of B cells (% of lymphocytes) remained reduced in all the groups. Therefore, this result indicates that the effect of the antibody is maintained for a long period of time. A similar reaction was exhibited in the group to which 4E1-7-B_f was administered.

As a result of immunohistochemical staining, it was confirmed that when 5.0 mg/kg of 4E1-7-B was administered, the positive region in the sample was reduced on Days 14 and 28 after the administration.

16) Statistical Analysis

All data analysis was performed by using JMP14.0 software (JMP Japan). The data were analyzed by using one-way analysis of variance followed by Tukey-Kramer multiple comparison test. As a result, it was determined that a significant difference exists if $P<0.05$.

Going through steps of 1) to 16) described above provided a monoclonal antibody or antibody fragment against canine CD20 that has a heavy chain variable region consisting of an amino acid sequence of SEQ ID NO: 1 or an amino acid sequence in which one or several amino acids are deleted, substituted, or added in the amino acid sequence of SEQ ID NO: 1, and a light chain variable region consisting of an amino acid sequence of SEQ ID NO: 2 or an amino acid sequence in which one or several amino acids are deleted, substituted, or added in the amino acid sequence of SEQ ID NO: 2, and that has a light chain constant region consisting of an amino acid sequence of SEQ ID NO: 3 or an amino acid sequence in which one or several amino acids are deleted, substituted, or added in the amino acid sequence of SEQ ID NO: 3.

INDUSTRIAL APPLICABILITY

The present invention enables provision of a monoclonal antibody or antibody fragment against canine CD20 having a more excellent effect than existing antibodies. The present invention also enables provision of a composition for reducing B cells in dogs and a method for reducing B cells in dogs, or a therapeutic composition for treating a disease caused by an increase in B cells in dogs such as B cell lymphoma, leukemia, or an autoimmune disease, and a method for treating a disease caused by an increase in B cells in dogs, using this monoclonal antibody or antibody fragment as an active ingredient.

The invention claimed is:

1. A monoclonal antibody or antibody fragment thereof against canine CD20 comprising: (i) a heavy chain variable region consisting of the amino acid sequence of SEQ ID NO: 1; and (ii) a light chain variable region consisting of the amino acid sequence of SEQ ID NO: 2, (iii) a light chain constant region consisting of the amino acid sequence of SEQ ID NO: 3 or an amino acid sequence in which one to fifteen amino acids are substituted in the amino acid sequence of SEQ ID NO: 3, and (iv) a heavy chain constant region consisting of the amino acid sequence of SEQ ID NO: 4 or 5 or an amino acid sequence in which one to fifteen amino acids are substituted in the amino acid sequence of SEQ ID NO: 4 or 5.

2. The antibody or antibody fragment thereof according to claim 1, wherein the antibody or antibody fragment is afucosylated.

3. A therapeutic composition for treating a disease caused by an increase in B cell number in dogs, comprising the antibody or antibody fragment thereof according to claim 1 as an active ingredient.

4. The therapeutic composition according to claim 3, wherein the disease is B-cell lymphoma, B-cell leukemia, or an autoimmune disease caused by antibodies from B-cells of increased number.

5. A dog B cell detection kit comprising: the antibody or antibody fragment thereof according to claim 1.

6. A kit for diagnosing a disease caused by an increase in B cell number in dogs, comprising: the antibody or antibody fragment thereof according to claim 1.

* * * * *

SEQUENCE LISTING

```
<160> NUMBER OF SEQ ID NOS: 21

<210> SEQ ID NO 1
<211> LENGTH: 137
<212> TYPE: PRT
<213> ORGANISM: Canine

<400> SEQUENCE: 1

Met Lys Leu Arg Leu Ser Leu Ile Phe Ile Cys Ala Leu Leu Lys Asp
1               5                   10                  15

Val Gln Cys Glu Val Gln Leu Val Glu Ser Gly Gly Gly Leu Val Gln
            20                  25                  30

Pro Gly Ala Ser Leu Lys Leu Ser Cys Val Ala Ser Gly Phe Thr Phe
        35                  40                  45
```

-continued

Asn Asp Tyr Trp Met Ser Trp Val Arg Gln Thr Pro Gly Lys Thr Met
    50                  55                  60

Glu Trp Ile Gly Asp Ile Lys Tyr Asp Gly Ser Tyr Thr Asn Tyr Ala
 65                  70                  75                  80

Pro Ser Leu Lys Asn Arg Phe Thr Ile Ser Arg Asp Asn Ala Lys Ser
                 85                  90                  95

Thr Leu Tyr Leu Gln Met Ser Asn Val Arg Ser Glu Asp Thr Ala Thr
            100                 105                 110

Tyr Tyr Cys Thr Arg Glu Ala Tyr Tyr Ser Gly Asp Tyr Trp Gly
            115                 120                 125

Gln Gly Val Met Val Thr Val Ser Ser
        130                 135

<210> SEQ ID NO 2
<211> LENGTH: 133
<212> TYPE: PRT
<213> ORGANISM: Canine

<400> SEQUENCE: 2

Met Lys Thr Asp Thr Leu Leu Leu Trp Ala Leu Leu Leu Trp Val Pro
 1               5                  10                  15

Gly Cys Thr Gly Asp Ile Val Leu Thr Gln Ser Pro Ala Leu Ala Val
                20                  25                  30

Ser Leu Gly Gln Arg Ala Thr Ile Ser Cys Lys Thr Asn Gln Asn Val
            35                  40                  45

Asp Tyr Tyr Gly Asn Ser Tyr Met His Trp Tyr Gln Gln Lys Pro Gly
    50                  55                  60

Gln Gln Pro Lys Leu Leu Ile Tyr Leu Ala Ser Asn Leu Ala Ser Gly
 65                  70                  75                  80

Ile Pro Ala Arg Phe Ser Gly Arg Gly Ser Gly Thr Asp Phe Thr Leu
                 85                  90                  95

Thr Ile Asp Pro Val Glu Ala Asp Thr Ala Thr Tyr Tyr Cys Gln
            100                 105                 110

Gln Ser Arg Asn Leu Pro Tyr Thr Phe Gly Ala Gly Thr Lys Leu Glu
            115                 120                 125

Leu Lys Arg Asn Asp
        130

<210> SEQ ID NO 3
<211> LENGTH: 110
<212> TYPE: PRT
<213> ORGANISM: Canine

<400> SEQUENCE: 3

Arg Asn Asp Ala Gln Pro Ala Val Tyr Leu Phe Gln Pro Ser Pro Asp
 1               5                  10                  15

Gln Leu His Thr Gly Ser Ala Ser Val Val Cys Leu Leu Asn Ser Phe
                20                  25                  30

Tyr Pro Lys Asp Ile Asn Val Lys Trp Lys Val Asp Gly Val Ile Gln
            35                  40                  45

Asp Thr Gly Ile Gln Glu Ser Val Thr Glu Gln Asp Lys Asp Ser Thr
    50                  55                  60

Tyr Ser Leu Ser Ser Thr Leu Thr Met Ser Ser Thr Glu Tyr Leu Ser
 65                  70                  75                  80

His Glu Leu Tyr Ser Cys Glu Ile Thr His Lys Ser Leu Pro Ser Thr
                 85                  90                  95

Leu Ile Lys Ser Phe Gln Arg Ser Glu Cys Gln Arg Val Asp
            100                 105                 110

<210> SEQ ID NO 4
<211> LENGTH: 334
<212> TYPE: PRT
<213> ORGANISM: Canine

<400> SEQUENCE: 4

Ser Thr Thr Ala Pro Ser Val Phe Pro Leu Ala Pro Ser Cys Gly Ser
1               5                   10                  15

Thr Ser Gly Ser Thr Val Ala Leu Ala Cys Leu Val Ser Gly Tyr Phe
            20                  25                  30

Pro Glu Pro Val Thr Val Ser Trp Asn Ser Gly Ser Leu Thr Ser Gly
        35                  40                  45

Val His Thr Phe Pro Ser Val Leu Gln Ser Ser Gly Leu Tyr Ser Leu
    50                  55                  60

Ser Ser Met Val Thr Val Pro Ser Ser Arg Trp Pro Ser Glu Thr Phe
65                  70                  75                  80

Thr Cys Asn Val Ala His Pro Ala Ser Lys Thr Lys Val Asp Lys Pro
                85                  90                  95

Val Pro Lys Arg Glu Asn Gly Arg Val Pro Arg Pro Pro Asp Cys Pro
            100                 105                 110

Lys Cys Pro Ala Pro Glu Met Leu Gly Gly Pro Ser Val Phe Ile Phe
        115                 120                 125

Pro Pro Lys Pro Lys Asp Thr Leu Leu Ile Ala Arg Thr Pro Glu Val
    130                 135                 140

Thr Cys Val Val Asp Leu Asp Pro Glu Asp Pro Glu Val Gln Ile
145                 150                 155                 160

Ser Trp Phe Val Asp Gly Lys Gln Met Gln Thr Ala Lys Thr Gln Pro
                165                 170                 175

Arg Glu Glu Gln Phe Asn Gly Thr Tyr Arg Val Val Ser Val Leu Pro
            180                 185                 190

Ile Gly His Gln Asp Trp Leu Lys Gly Lys Gln Phe Thr Cys Lys Val
        195                 200                 205

Asn Asn Lys Ala Leu Pro Ser Pro Ile Glu Arg Thr Ile Ser Lys Ala
    210                 215                 220

Arg Gly Gln Ala His Gln Pro Ser Val Tyr Val Leu Pro Pro Ser Arg
225                 230                 235                 240

Glu Glu Leu Ser Lys Asn Thr Val Ser Leu Thr Cys Leu Ile Lys Asp
                245                 250                 255

Phe Phe Pro Pro Asp Ile Asp Val Glu Trp Gln Ser Asn Gly Gln Gln
            260                 265                 270

Glu Pro Glu Ser Lys Tyr Arg Thr Thr Pro Pro Gln Leu Asp Glu Asp
        275                 280                 285

Gly Ser Tyr Phe Leu Tyr Ser Lys Leu Ser Val Asp Lys Ser Arg Trp
    290                 295                 300

Gln Arg Gly Asp Thr Phe Ile Cys Ala Val Met His Glu Ala Leu His
305                 310                 315                 320

Asn His Tyr Thr Gln Glu Ser Leu Ser His Ser Pro Gly Lys
                325                 330

<210> SEQ ID NO 5
<211> LENGTH: 332
<212> TYPE: PRT

<213> ORGANISM: Canine

<400> SEQUENCE: 5

Ser Thr Thr Ala Pro Ser Val Phe Pro Leu Ala Pro Ser Cys Gly Ser
1               5                   10                  15

Gln Ser Gly Ser Thr Val Ala Leu Ala Cys Leu Val Ser Gly Tyr Ile
            20                  25                  30

Pro Glu Pro Val Thr Val Ser Trp Asn Ser Gly Ser Leu Thr Ser Gly
        35                  40                  45

Val His Thr Phe Pro Ser Val Leu Gln Ser Ser Gly Leu Tyr Ser Leu
    50                  55                  60

Ser Ser Met Val Thr Val Pro Ser Ser Arg Trp Pro Ser Glu Thr Phe
65                  70                  75                  80

Thr Cys Asn Val Ala His Pro Ala Thr Asn Thr Lys Val Asp Lys Pro
                85                  90                  95

Val Val Lys Glu Cys Glu Cys Lys Cys Asn Cys Asn Asn Cys Pro Cys
            100                 105                 110

Pro Gly Cys Gly Leu Leu Gly Gly Pro Ser Val Phe Ile Phe Pro Pro
        115                 120                 125

Lys Pro Lys Asp Ile Leu Val Thr Ala Arg Thr Pro Thr Val Thr Cys
130                 135                 140

Val Val Val Asp Leu Asp Pro Glu Asn Pro Glu Val Gln Ile Ser Trp
145                 150                 155                 160

Phe Val Asp Ser Lys Gln Val Gln Thr Ala Asn Thr Gln Pro Arg Glu
                165                 170                 175

Glu Gln Ser Asn Gly Thr Tyr Arg Val Ser Val Leu Pro Ile Gly
            180                 185                 190

His Gln Asp Trp Leu Ser Gly Lys Gln Phe Lys Cys Lys Val Asn Asn
    195                 200                 205

Lys Ala Leu Pro Ser Pro Ile Glu Glu Ile Ile Ser Lys Thr Pro Gly
210                 215                 220

Gln Ala His Gln Pro Asn Val Tyr Val Leu Pro Pro Ser Arg Asp Glu
225                 230                 235                 240

Met Ser Lys Asn Thr Val Thr Leu Thr Cys Leu Val Lys Asp Phe Phe
                245                 250                 255

Pro Pro Glu Ile Asp Val Glu Trp Gln Ser Asn Gly Gln Gln Glu Pro
            260                 265                 270

Glu Ser Lys Tyr Arg Met Thr Pro Pro Gln Leu Asp Glu Asp Gly Ser
        275                 280                 285

Tyr Phe Leu Tyr Ser Lys Leu Ser Val Asp Lys Ser Arg Trp Gln Arg
    290                 295                 300

Gly Asp Thr Phe Ile Cys Ala Val Met His Glu Ala Leu His Asn His
305                 310                 315                 320

Tyr Thr Gln Lys Ser Leu Ser His Ser Pro Gly Lys
                325                 330

<210> SEQ ID NO 6
<211> LENGTH: 32
<212> TYPE: DNA
<213> ORGANISM: Artificial Sequence
<220> FEATURE:
<223> OTHER INFORMATION: Primer

<400> SEQUENCE: 6
gcgcggccgc tctcaggagt tcagagggtg ag        32

```
<210> SEQ ID NO 7
<211> LENGTH: 28
<212> TYPE: DNA
<213> ORGANISM: Artificial Sequence
<220> FEATURE:
<223> OTHER INFORMATION: Primer

<400> SEQUENCE: 7
cagaattctc aggaaacagg ggtggata                                    28

<210> SEQ ID NO 8
<211> LENGTH: 30
<212> TYPE: DNA
<213> ORGANISM: Artificial Sequence
<220> FEATURE:
<223> OTHER INFORMATION: Primer

<400> SEQUENCE: 8
ccaggtgacc ccattcagtg ctcaggacac                                  30

<210> SEQ ID NO 9
<211> LENGTH: 28
<212> TYPE: DNA
<213> ORGANISM: Artificial Sequence
<220> FEATURE:
<223> OTHER INFORMATION: Primer

<400> SEQUENCE: 9
gggtgggggg cttgctgggt gccgggcg                                    28

<210> SEQ ID NO 10
<211> LENGTH: 20
<212> TYPE: DNA
<213> ORGANISM: Artificial Sequence
<220> FEATURE:
<223> OTHER INFORMATION: Primer

<400> SEQUENCE: 10
cactgtccgt gtctgtcagc                                             20

<210> SEQ ID NO 11
<211> LENGTH: 19
<212> TYPE: DNA
<213> ORGANISM: Artificial Sequence
<220> FEATURE:
<223> OTHER INFORMATION: Primer

<400> SEQUENCE: 11
ccaaggcctg agctaggag                                              19

<210> SEQ ID NO 12
<211> LENGTH: 32
<212> TYPE: DNA
<213> ORGANISM: Artificial Sequence
<220> FEATURE:
<223> OTHER INFORMATION: Primer

<400> SEQUENCE: 12
acggatccat gacaacaccc agaaattcaa tg                               32

<210> SEQ ID NO 13
<211> LENGTH: 38
<212> TYPE: DNA
<213> ORGANISM: Artificial Sequence
<220> FEATURE:
<223> OTHER INFORMATION: Primer
```

<400> SEQUENCE: 13
gtcgatgtca tgatctttat aatcagggat gctgtcgt                             38

<210> SEQ ID NO 14
<211> LENGTH: 39
<212> TYPE: DNA
<213> ORGANISM: Artificial Sequence
<220> FEATURE:
<223> OTHER INFORMATION: Primer

<400> SEQUENCE: 14
tcactacttg tcatcgtcat ccttgtagtc gatgtcatg                            39

<210> SEQ ID NO 15
<211> LENGTH: 20
<212> TYPE: DNA
<213> ORGANISM: Artificial Sequence
<220> FEATURE:
<223> OTHER INFORMATION: Primer

<400> SEQUENCE: 15
gctaaggtgg tggacttgga                                                 20

<210> SEQ ID NO 16
<211> LENGTH: 20
<212> TYPE: DNA
<213> ORGANISM: Artificial Sequence
<220> FEATURE:
<223> OTHER INFORMATION: Primer

<400> SEQUENCE: 16
ccgccccgac tctagaatta                                                 20

<210> SEQ ID NO 17
<211> LENGTH: 23
<212> TYPE: DNA
<213> ORGANISM: Artificial Sequence
<220> FEATURE:
<223> OTHER INFORMATION: Primer

<400> SEQUENCE: 17
tgccatcaat cttccacttg aca                                             23

<210> SEQ ID NO 18
<211> LENGTH: 20
<212> TYPE: DNA
<213> ORGANISM: Artificial Sequence
<220> FEATURE:
<223> OTHER INFORMATION: Primer

<400> SEQUENCE: 18
aaytttcttg tccaccttgg                                                 20

<210> SEQ ID NO 19
<211> LENGTH: 36
<212> TYPE: DNA
<213> ORGANISM: Artificial Sequence
<220> FEATURE:
<223> OTHER INFORMATION: Primer

<400> SEQUENCE: 19
ggccacgcgt cgactagtac gggggggggg gggggg                               36

<210> SEQ ID NO 20

```
<211> LENGTH: 28
<212> TYPE: DNA
<213> ORGANISM: Artificial Sequence
<220> FEATURE:
<223> OTHER INFORMATION: Primer

<400> SEQUENCE: 20
gttgttcawg argcacacga ctgaggca                                        28

<210> SEQ ID NO 21
<211> LENGTH: 20
<212> TYPE: DNA
<213> ORGANISM: Artificial Sequence
<220> FEATURE:
<223> OTHER INFORMATION: Primer

<400> SEQUENCE: 21
aatagccctt gaccaggcat                                                 20
```